| (12) | United States Patent | (10) Patent No.: US 11,958,920 B2 |
|---|---|---|
| | Kuniyasu et al. | (45) Date of Patent: Apr. 16, 2024 |

(54) ACTIVE ENERGY RAY CURABLE COMPOSITION

(71) Applicant: Asia Stencil Paper Co., Ltd., Gifu (JP)

(72) Inventors: Satoshi Kuniyasu, Gifu (JP); Kazuhiro Tanaka, Gifu (JP)

(73) Assignee: Asia Stencil Paper Co., Ltd., Gifu (JP)

( * ) Notice: Subject to any disclaimer, the term of this patent is extended or adjusted under 35 U.S.C. 154(b) by 64 days.

(21) Appl. No.: 17/692,291

(22) Filed: Mar. 11, 2022

(65) Prior Publication Data

US 2022/0298269 A1 Sep. 22, 2022

(30) Foreign Application Priority Data

Mar. 18, 2021 (JP) ................................. 2021-044804

(51) Int. Cl.
| | | |
|---|---|---|
| *C08F 2/50* | (2006.01) | |
| *C08F 220/18* | (2006.01) | |
| *C08F 220/30* | (2006.01) | |
| *C08F 222/10* | (2006.01) | |
| *C08K 5/18* | (2006.01) | |
| *C08K 5/372* | (2006.01) | |
| *C08K 5/375* | (2006.01) | |
| *C08K 5/5397* | (2006.01) | |
| *C09D 11/10* | (2014.01) | |
| *C09D 11/101* | (2014.01) | |

(52) U.S. Cl.
CPC .......... *C08F 2/50* (2013.01); *C08F 220/1808* (2020.02); *C08F 220/306* (2020.02); *C08F 222/102* (2020.02); *C08K 5/18* (2013.01); *C08K 5/3725* (2013.01); *C08K 5/375* (2013.01); *C08K 5/5397* (2013.01); *C09D 11/101* (2013.01)

(58) Field of Classification Search
None
See application file for complete search history.

(56) References Cited

U.S. PATENT DOCUMENTS

| 8,128,843 | B2* | 3/2012 | Umebayashi | ........ C09D 11/101 |
|---|---|---|---|---|
| | | | | 522/63 |
| 8,449,095 | B2* | 5/2013 | Breton | ...................... C08F 2/48 |
| | | | | 347/88 |
| 9,701,857 | B2* | 7/2017 | Yamada | ............... C09D 11/322 |
| 2009/0099277 | A1* | 4/2009 | Nagvekar | ............ C08G 18/672 |
| | | | | 526/194 |
| 2010/0048756 | A1* | 2/2010 | Loccufier | ............. C09D 133/26 |
| | | | | 522/30 |
| 2010/0255211 | A1 | 10/2010 | Kawashima et al. | |
| 2012/0077896 | A1* | 3/2012 | Ishima | ................. B41M 5/0047 |
| | | | | 522/75 |
| 2014/0275319 | A1 | 9/2014 | Yamada et al. | |
| 2015/0240094 | A1* | 8/2015 | Kagose | ................ C09D 11/101 |
| | | | | 522/64 |

FOREIGN PATENT DOCUMENTS

| JP | 2007-031667 | | 2/2007 | | |
|---|---|---|---|---|---|
| JP | 2009-179681 | A | 8/2009 | | |
| JP | 2010/241894 | A | 10/2010 | | |
| JP | 2012-140491 | A | 7/2012 | | |
| WO | WO-2010/140360 | A1 | 12/2010 | | |
| WO | WO-2013/062090 | A1 | 5/2013 | | |
| WO | WO-2016136098 | A1 * | 9/2016 | ................ | B41J 2/01 |
| WO | WO-2018088461 | A1 * | 5/2018 | ................ | B41J 2/01 |

OTHER PUBLICATIONS

Atsushi Tomotake, "Technology and Feature of UV Curable Inkjet Ink", Journal of the Imaging Society of Japan, vol. 49, No. 5, 2010, pp. 412-416.
Office Action in JP Application No. 2021-044804 dated Jun. 20, 2023, 7 pages.

* cited by examiner

*Primary Examiner* — Sanza L. McClendon
(74) *Attorney, Agent, or Firm* — MARSHALL, GERSTEIN & BORUN LLP

(57) ABSTRACT

Provided is an active energy ray curable composition cured by irradiation of active energy rays. The active energy ray curable composition contains an (A) radical polymerizable compound, a (B) photopolymerization initiator, and a (C) amine compound. The (B) photopolymerization initiator includes a (B1) sulfur compound and a (B2) acyl phosphine oxide compound. The (B1) sulfur compound is at least one of a sulfone compound and a thiobenzoyl compound.

9 Claims, No Drawings

ACTIVE ENERGY RAY CURABLE COMPOSITION

BACKGROUND

1. Field

The following description relates to an active energy ray curable composition.

2. Description of Related Art

An active energy ray curable composition is known as an example of an ink composition used in printing such as inkjet printing (see, for example, Japanese Laid-Open Patent Publication No. 2007-31667, International Publication No. WO 2010/140360, Japanese Laid-Open Patent Publication No. 2010-241894, and Journal of the Imaging Society of Japan, Vol. 49, No. 5, 412-416 (2010)). Unlike, for example, a composition with which a solvent or a dispersant is volatilized to form a film, an active energy ray curable composition does not require a drying step and therefore, for example, facilitates production efficiency of printed matter. As polymerizable compounds contained in an active energy ray curable composition, radical polymerizable compounds and cationic polymerizable compounds are known.

Among such polymerizable compounds used in an active energy ray curable composition, radical polymerizable compounds are lower in cost and higher in versatility than cationic polymerizable compounds. However, a polymerization reaction of a radical polymerizable compound by irradiation of active energy rays is easily inhibited by oxygen dissolved in the active energy ray curable composition and oxygen in the atmosphere. Due to such circumstances, an active energy ray curable composition that contains a radical polymerization compound and can be further improved in curability is being sought.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an active energy ray curable composition is provided that is cured by irradiation of active energy rays. The active energy ray curable composition contains an (A) radical polymerizable compound, a (B) photopolymerization initiator, and a (C) amine compound. The (B) photopolymerization initiator includes a (B1) sulfur compound and a (B2) acyl phosphine oxide compound. The (B1) sulfur compound is at least one of a sulfone compound and a thiobenzoyl compound.

Other features and aspects will be apparent from the following detailed description and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of an active energy ray curable composition will now be described.

The active energy ray curable composition of the embodiment is cured by irradiation of active energy rays. The active energy ray curable composition contains an (A) radical polymerizable compound, a (B) photopolymerization initiator, and a (C) amine compound.

<(A) Radical Polymerizable Compound>

The radical polymerizable compound is cured through a polymerization reaction when active energy rays are irradiated. Examples of the active energy rays include ultraviolet rays (UV) and an electron beam (EB).

The radical polymerizable compound has a single functional group or multiple functional groups and may be a monomer or an oligomer.

Examples of the radical polymerizable compound having a single functional group include a (meth)acrylate. Examples of a monofunctional (meth)acrylate include butylcyclohexanol acrylate, isobornyl acrylate, (2-methyl-2-ethyl-1,3-dioxolane-4-yl)methyl acrylate, tetrahydrofurfuryl acrylate, cyclohexyl acrylate, 4-t-butylcyclohexyl acrylate, caprolactone modified tetrahydrofurfuryl acrylate, acryloylmorpholine, 1,4-cyclohexanedimethanol monoacrylate, 2-hydroxyethyl acrylate, 2-hydroxypropyl acrylate, 4-hydroxybutyl acrylate, isobutyl acrylate, t-butyl acrylate, isooctyl acrylate, isodecyl acrylate, tridecyl acrylate, 2-methoxyethyl acrylate, methoxytriethylene glycol acrylate, 2-ethoxyethyl acrylate, 3-methoxybutyl acrylate, ethoxyethoxyethyl acrylate, butoxyethyl acrylate, ethoxydiethylene glycol acrylate, methoxydipropylene glycol acrylate, dipropylene glycol acrylate, β-carboxyethyl acrylate, ethyl diglycol acrylate, trimethylolpropane formal monoacrylate, imide acrylate, isoamyl acrylate, ethoxylated succinic acid acrylate, trifluoroethyl acrylate, and ω-carboxypolycaprolactone monoacrylate.

Examples of the radical polymerizable compound having multiple functional groups include a di(meth)acrylate. Examples of the di(meth)acrylate include dipropylene glycol diacrylate, tripropylene glycol diacrylate, butanediol diacrylate, dimethylol-tricyclodecane diacrylate, propoxylated bisphenol A di(meth)acrylate, ethoxylated bisphenol A di(meth)acrylate, cyclohexanedimethanol di(meth)acrylate, dimethyloldicyclopentane diacrylate, ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentyl glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, hydroxypivalic acid neopentyl glycol diacrylate, 1,3-butylene glycol di(meth)acrylate, ethoxylated tripropylene glycol diacrylate, neopentyl glycol modified trimethylolpropane diacrylate, stearic acid modified pentaerythritol diacrylate, ethoxylated neopentyl glycol di(meth)acrylate, propoxylated neopentyl glycol di(meth)acrylate, and tripropylene glycol di(meth)acrylate.

Further examples of the radical polymerizable compound having multiple functional groups include a triacrylate, a tetraacrylate, a pentaacrylate, a hexaacrylate, and an oligoacrylate. Examples of the triacrylate include trimethylolpropane triacrylate, hydroxypivalic acid trimethylolpropane triacrylate, ethoxylated phosphoric acid triacrylate, ethoxylated isocyanuric acid triacrylate, tri(2-hydroxyethylisocyanurate) triacrylate, pentaerythritol triacrylate, tetramethylolpropane triacrylate, tetramethylolmethane triacrylate, caprolactone-modified trimethylolpropane triacrylate, propoxylated glyceryl triacrylate, ethoxylated trimethylolpropane triacrylate, and propoxylated trimethylolpropane triacrylate. Examples of the tetraacrylate include pentaerythritol tetraacrylate, tetramethylolmethane tetraacrylate, ditrimethylolpropane tetraacrylate, and ethoxylated pentaerythritol tetraacrylate. Examples of the pentaacrylate include dipentaerythritol hydroxypentaacrylate. Examples of the hexaacrylate include dipentaerythritol hexaacrylate and caprolactone modified dipentaerythritol hexaacrylate. Examples of the oligoacrylate include neopentylglycol oligoacrylate, 1,4-butanediol oligoacrylate, 1,6-hexanediol oligoacrylate, trimethylolpropane oligoacrylate, and pentaerythritol oligoacrylate.

Further examples of the radical polymerizable compound include an oligomer formed from an abovementioned monomer, epoxy (meth)acrylate, oxetane (meth)acrylate, a cyclic or straight chain aliphatic urethane (meth)acrylate, an aromatic urethane (meth)acrylate, polyether (meth)acrylate, and polyester (meth)acrylate.

One or more kinds of radical polymerizable compounds may be used. Also, (meth)acrylate means methacrylate or acrylate.

The number of functional groups of the radical polymerizable compound is preferably 1 to 3 from a standpoint of making the active energy ray curable composition low in viscosity.

The radical polymerizable compound preferably contains at least one of the following (A1) first polymerizable compound and (A2) second polymerizable compound from a standpoint of being excellent in reactivity to irradiation of active energy rays.

The (A1) first polymerizable compound has a (meth)acryloyl group and at least one of a vinyl ether group and an allyl ether group. The (A2) second polymerizable compound is a (meth)acrylate compound having an aromatic skeleton.

Examples of the (A1) first polymerizable compound include 2-(2-vinyloxyethoxy)ethyl acrylate (trade name: VEEA; manufactured by Nippon Shokubai Co., Ltd.), 2-(2-vinyloxyethoxy)ethyl methacrylate (trade name: VEEM; manufactured by Nippon Shokubai Co., Ltd.), and methyl 2-(allyloxymethyl) acrylate (trade name: AOMA (FX-AOMA); manufactured by Nippon Shokubai Co., Ltd.).

Examples of the (A2) second polymerizable compound include benzyl (meth)acrylate, methylphenoxyethyl (meth)acrylate, 2-phenoxyethyl (meth)acrylate, phenoxypolyethylene glycol (meth)acrylate, phenoxypolypropylene glycol (meth)acrylate, phenoxypolyethylene-polypropylene glycol (meth)acrylate, phenoxydiethylene glycol (meth)acrylate, and 2-hydroxy-3-phenoxypropyl (meth)acrylate.

The active energy ray curable composition has a content of the radical polymerizable compound of preferably not less than 60% by mass, more preferably not less than 70% by mass, and even more preferably not less than 75% by mass. The content of the radical polymerizable compound in the active energy ray curable composition is preferably not more than 99% by mass and more preferably not more than 95% by mass.

<(B) Photopolymerization Initiator>

The photopolymerization initiator initiates the polymerization reaction of the radical polymerizable compound by the irradiation of active energy rays. The photopolymerization initiator may be of a photoradical polymerization type. Examples of the photopolymerization initiator being of a photoradical polymerization type include photopolymerization initiators of an intramolecular cleavage type and photopolymerization initiators of a hydrogen abstraction type. One or more kinds of photopolymerization initiators may be used.

The photopolymerization initiator includes a (B1) sulfur compound and a (B2) acyl phosphine oxide compound.

The (B1) sulfur compound is at least one of a sulfone compound and a thiobenzoyl compound. Examples of the sulfone compound include 1-[4-(4-benzoylphenylsulfanyl)phenyl]-2-methyl-2-(4-methylphenylsulfonyl)propane-1-one and tribromomethylphenylsulfone. Examples of the thiobenzoyl compound include 2-methyl-1-[4-(methylthio)phenyl]-2-morpholinopropane-1-one, 4-benzoyl 4'-methyldiphenyl sulfide, and 1-[4-(phenylthiol)phenyl]-octane-1,2-dione-2-(O-benzoyloxime).

Examples of the (B2) acyl phosphine oxide compound include 2,4,6-trimethylbenzoyl-diphenyl-phosphine oxide, bis(2,4,6-trimethylbenzoyl)-phenylphosphine oxide, ethyl phenyl(2,4,6-trimethylbenzoyl)phosphinate, and ethyl (3-benzoyl-2,4,6-trimethylbenzoyl)(phenyl)phosphine oxide.

The photopolymerization initiator preferably further includes a (B3) thioxanthone compound. Examples of the (B3) thioxanthone compound include thioxanthone, 2-chlorothioxanthone, 2,4-dichlorothioxanthone, 2-methylthioxanthone, 2,4-dimethylthioxanthone, 2,4-diethylthioxanthone, isopropylthioxanthone, and 2-isopropylthioxanthone.

The photopolymerization initiator may contain a compound other than the above as necessary. Examples of the compound other than the above to be contained in the photopolymerization initiator include an alkylphenone compound, an imidazole compound, and a triazine compound. However, as the photopolymerization initiator, it is preferable to select and use that which is unlikely to influence a color tone of a cured product resulting from curing of the active energy ray curable composition. Especially with an active energy ray curable composition such as a decorating ink or an overprint varnish that does not contain a colorant and forms a transparent cured product, it is preferable to select and use a photopolymerization initiator that does not become a cause of coloring such as yellowing of the cured product.

Examples of the alkylphenone compound include 2,2-dimethoxy-1,2-diphenylethane-1-one, 1-hydroxycyclohexyl phenyl ketone, 2-hydroxy-2-methyl-1-phenylpropane-1-one, 1-[4-(2-hydroxyethoxy)-phenyl]-2-hydroxy-2-methyl-1-propane-1-one, 2-hydroxy-1-{4-[4-{2-hydroxy-2-methylpropionyl}-benzyl]-phenyl}-2-methylpropane-1-one, 2-benzyl-2-dimethylamino-1-(4-morpholinophenyl)-butane-1-one, and 2-dimethylamino-2-(4-methylbenzyl)-1-(4-morpholine-4-yl-phenyl)-butane-1-one.

Examples of the imidazole compound include 2'-bis(2-chlorophenyl)-4,4',5,5'-tetraphenyl-1,2'-biimidazole, 2,2'-bis(2-chlorophenyl)-4,4',5,5'-tetraphenyl-1,2'-biimidazole, and 2,2',4-tris(2-chlorophenyl)-5-(3,4-dimethoxyphenyl)-4',5'-diphenyl-1,1'-biimidazole.

Examples of the triazine compound include 2-[2-(4-methoxyphenyl)ethenyl]-4,6-bis(trichloromethyl)-1,3,5-triazine and 2-[4'-ethyl(1,1'-biphenyl)-4-yl]-4,6-bis(trichloromethyl)-1,3,5-triazine.

The active energy ray curable composition has a content of the photopolymerization initiator of preferably not less than 4.2% by mass, more preferably not less than 4.5% by mass, and even more preferably not less than 5.0% by mass. The content of the photopolymerization initiator in the active energy ray curable composition is preferably not more than 20% by mass, more preferably not more than 18% by mass, and even more preferably not more than 15% by mass.

The active energy ray curable composition has a content of the (B1) sulfur compound of preferably not less than 0.4% by mass. From a standpoint of solubility to the radical polymerizable compound, the content of the (B1) sulfur compound in the active energy ray curable composition is preferably not more than 15% by mass.

The active energy ray curable composition has a content of the (B2) acyl phosphine oxide compound of preferably not less than 0.7% by mass. From a standpoint of suppressing yellowing of the cured product, the content of the (B2) acyl phosphine oxide compound in the active energy ray curable composition is preferably not more than 12% by mass.

The active energy ray curable composition has a content of the (B3) thioxanthone compound of preferably not more than 1.0% by mass, more preferably not more than 0.5% by mass, and even more preferably not more than 0.3% by mass.

<(C) Amine Compound>

Examples of the (C) amine compound include a (C1) amino modified compound, a (C2) aromatic amine compound, and a (C3) aliphatic amine compound.

The (C1) amino modified compound is at least one of an amino modified acrylate oligomer and an amino modified acrylate polymer. Examples of the (C1) amino modified compound include commercial products manufactured by Daicel-Allnex Ltd. (trade names: EBECRYL 80 and EBECRYL 7100), a commercial product manufactured by Toagosei Co., Ltd. (trade name: ARON DA), a commercial product manufactured by KJ Chemicals Corporation (trade name: DMAPAA), commercial products manufactured by RAHN AG (trade names: GENOMER 5142, GENOMER 5161, GENOMER 5271, GENOMER 5275, and GENOMER 5695), and commercial products manufactured by Sartomer Corporation (trade names: CN 383, CN 371NS, CN 386, CN 549NS, CN 550, CN 551NS, and CN 373).

Examples of the (C2) aromatic amine compound include p-diethylaminoacetophenone, ethyl p-dimethylaminobenzoate, isoamyl dimethylaminobenzoate, {α-4-(dimethylamino)benzoylpoly(oxyethylene)-poly[oxy(1-methylethylene)]-poly(oxyethylene)} 4-(dimethylamino)-benzoate, poly(ethylene glycol) bis(p-dimethylaminobenzoate), N,N-dimethylbenzylamine, (methylamino)diethane-2,1-diyl bis[4-(dimethylamino)-benzoate], and 4,4'-bis(diethylamino) benzophenone.

Examples of the (C3) aliphatic amine compound include trimethylamine, methyldimethanolamine, triethanolamine, and N-methyldiethanolamine.

The (C) amine compound preferably includes at least one of the (C1) amino modified compound and the (C2) aromatic amine compound.

The active energy ray curable composition has a content of the (C) amine compound of preferably not less than 0.1% by mass. The content of the (C) amine compound in the active energy ray curable composition is preferably not more than 20% by mass. The content of the (C) amine compound in the active energy ray curable composition is more preferably within a range of not less than 0.5% by mass and not more than 15% by mass and even more preferably within a range of not less than 1.0% by mass and not more than 10% by mass.

<Components Other than the Above>

A polymer may also be contained in the active energy ray curable composition. Examples of the polymer include a (meth)acrylic resin, an epoxy resin, a ketone resin, a diallyl phthalate resin, a chlorinated polyolefin resin, a vinyl chloride resin, a polyvinyl acetal resin, and a polyester resin. One or more kinds of polymers may be used.

Examples of the (meth)acrylic resin include a copolymer of methyl methacrylate and n-butyl methacrylate, methyl (meth)acrylate polymer, ethyl (meth)acrylate polymer, n-butyl (meth)acrylate polymer, isobutyl (meth)acrylate polymer, t-butyl (meth)acrylate polymer, 2-ethylhexyl (meth)acrylate polymer, and cyclohexyl (meth)acrylate polymer.

Another examples of the (meth)acrylic resin include commercial products manufactured by Mitsubishi Rayon Co., Ltd. (trade names: Dianal B R, Dianal H R, Dianal H W, Dianal L P, Dianal L R, Dianal L W, Dianal L X, and Dianal S E), commercial products manufactured by Hitachi Chemical Company, Ltd. (trade names: HITALOID 7988 and HITALOID 7975D), commercial products manufactured by Negami Chemical Industrial Co., Ltd. (trade names: Hi-pearl M-4006, Hi-pearl M-4501, Hi-pearl M-5000, and Hi-pearl M-5001), and commercial products manufactured by Arakawa Chemical Industries, Ltd. (trade names: BEAMSET 243NS, BEAMSET 255, BEAMSET 261, and BEAMSET 271).

Examples of the epoxy resin include those of a bisphenol A type and a bisphenol F type.

Examples of the ketone resin include a ketone-aldehyde condensation resin, a ketone resin obtained by reacting an aldehyde compound such as formaldehyde, and a urethane modified ketone resin. Examples of the ketone resin include a commercial product manufactured by Arakawa Chemical Industries, Ltd. (trade name: K-90) and commercial products manufactured by EVONIK Industries AG (trade names: VariPlus AP, VariPlus SK, VariPlus 1201TF, and VariPlus CA), Examples of the diallyl phthalate resin include commercial products manufactured by Osaka Soda Co., Ltd. (trade names: DAISO DAP, DAISO ISO DAP, DAISO DAP Monomer, and DAISO DAP 100 Monomer).

Examples of the chlorinated polyolefin resin include commercial products manufactured by Nippon Paper Industries Co., Ltd. (trade names: SUPERCHLON 814HS and SUPERCHLON 390S) and commercial products manufactured by Toyobo Co., Ltd. (trade names: HARDLEN 13-LLP and HARDLEN 15-LLP). Examples of the vinyl chloride resin include commercial products manufactured by Nissin Chemical Industry Co., Ltd. (trade names: SOLBIN CL, SOLBIN CNL, SOLBIN CSR, and SOLBIN TASR) and commercial products manufactured by Kaneka Corporation (trade names: Kanevinyl M Series, Kanevinyl HM Series, and Kanevinyl T5 Series).

Examples of the polyvinyl acetal resin include commercial products manufactured by Sekisui Chemical Co., Ltd. (trade names: S-LEC B, S-LEC KX, and S-LEC KW). Examples of the polyester resin include commercial products manufactured by Takamatsu Oil & Fat Co., Ltd. (trade names: PESRESIN A Series and PESRESIN S Series) and commercial products manufactured by Toyobo Co., Ltd. (trade names: VYLON 103, VYLON 200, and VYLON 220).

The active energy ray curable composition has a content of the polymer of preferably not less than 0.1 parts by mass, more preferably not less than 1 part by mass, and even more preferably not less than 3 parts by mass with respect to 100 parts by mass of the radical polymerizable compound. The content of the polymer in the active energy ray curable composition with respect to 100 parts by mass of the radical polymerizable compound is preferably not more than 20 parts by mass, more preferably not more than 15 parts by mass, and even more preferably not more than 10 parts by mass.

A surface tension regulator may also be contained in the active energy ray curable composition. The surface tension regulator is a compound capable of regulating the surface tension of the active energy ray curable composition to be within a predetermined range. Examples of the surface tension regulator include an ionic surfactant, a nonionic surfactant, a modified silicone oil, and an organic solvent.

Examples of an anionic surfactant that is an ionic surfactant include fatty acid salts, alkyl sulfuric acid ester salts, benzenesulfonic acid salts, naphthalenesulfonic acid salts, sulfosuccinic acid ester salts, polyoxyethylene sulfuric acid ester salts, and phosphoric acid ester salts.

Examples of the fatty acid salts include sodium stearate, potassium oleate, and sodium salt of semi-hardened beef tallow fatty acid.

Examples of the alkyl sulfuric acid ester salts include sodium dodecyl sulfate, tri(2-hydroxyethyl)ammonium dodecyl sulfate, and sodium octadecyl sulfate.

Examples of the benzenesulfonic acid salts include sodium nonyl benzenesulfonate, sodium dodecyl benzenesulfonate, sodium octadecyl benzenesulfonate, and sodium dodecyl diphenyl ether disulfonate.

Examples of the naphthalenesulfonic acid salts include sodium dodecyl naphthalenesulfonate and naphthalenesulfonic acid formalin condensate.

Examples of the sulfosuccinic acid ester salts include sodium didodecyl sulfosuccinate and sodium dioctadecyl sulfosuccinate.

Examples of the polyoxyethylene sulfuric acid ester salts include sodium polyoxyethylene dodecyl ether sulfate, tri(2-hydroxyethyl)ammonium polyoxyethylene dodecyl ether sulfate, sodium polyoxyethylene octadecyl ether sulfate, and sodium polyoxyethylene dodecyl phenyl ether sulfate.

Examples of the phosphoric acid ester salts include potassium dodecyl phosphate and sodium octadecyl phosphate.

Examples of a cationic surfactant that is an ionic surfactant include quaternary ammonium salts. Examples of the quaternary ammonium salts include octadecylammonium acetate, alkylamine salts, such as coconut oil amine acetate, dodecyltrimethylammonium chloride, octadecyltrimethylammonium chloride, dioctadecyldimethylammonium chloride, and dodecylbenzyldimethylammonium chloride.

Examples of a zwitterionic surfactant that is an ionic surfactant include alkyl betaines and amine oxides. Examples of the alkyl betaines include dodecyl betaine and octadecyl betaine. Examples of the amine oxides include dodecyldimethylamine oxide.

Examples of the nonionic surfactant include polyoxyethylene alkyl ethers, polyoxyethylene phenyl ethers, oxirane polymers, sorbitan fatty acid esters, sorbitol fatty acid esters, and glycerin fatty acid esters.

Examples of the polyoxyethylene alkyl ethers include polyoxyethylene dodecyl ether, polyoxyethylene hexadecyl ether, polyoxyethylene octadecyl ether, and polyoxyethylene (9-octadecyl) ether.

Examples of the polyoxyethylene phenyl ethers include polyoxyethylene octyl phenyl ether and polyoxyethylene nonyl phenyl ether.

Examples of the oxirane polymers include polyethylene oxide and polyethylene oxide-propylene oxide copolymer.

Examples of the sorbitan fatty acid esters include sorbitan dodecanoate, sorbitan hexadecanoate, sorbitan octadecanoate, sorbitan (9-octadecenoate), sorbitan tri(9-octadecenoate), polyoxyethylene sorbitan dodecanoate, polyoxyethylene sorbitan hexadecanoate, polyoxyethylene sorbitan octadecanoate, polyoxyethylene sorbitan trioctadecanoate, polyoxyethylene sorbitan (9-octadecenoate), and polyoxyethylene sorbitan tri(9-octadecenoate).

Examples of the sorbitol fatty acid esters include polyoxyethylene sorbitol tetra(9-octadecenoate).

Examples of the glycerin fatty acid ester include glycerin octadecanoate and glycerin (9-octadecenoate).

Examples of the modified silicone oil include polyether modified silicone oil, methyl styrene modified silicone oil, olefin modified silicone oil, alcohol modified silicone oil, and alkyl modified silicone oil. Among the modified silicone oils, it is preferable to use a modified silicone oil with various organic groups introduced therein because satisfactory solubility is exhibited in the active energy ray curable composition. Examples of the modified silicone oil with various organic groups introduced therein include (meth)acryl-terminated modified silicone oil and epoxy-terminated modified silicone oil.

The modified silicone oil does not bleed excessively on the surface of a cured product formed on a base material. Stickiness of the surface of the cured product and migration of oil through the surface of the cured product can thus be suppressed. Among the modified silicone oils, a compound is preferable that is cured by irradiation of the active energy rays. Examples of such a compound include silicone polyether acrylate, polyether modified siloxane copolymer, and epoxy modified silicone oil.

Examples of the organic solvent include esters, ketones, cyclic ethers, amides, aromatic hydrocarbons, glycol ethers, diethylene glycol esters, aliphatic hydrocarbons, and alcohols.

Examples of the esters include ethyl acetate, butyl acetate, isopropyl acetate, isobutyl acetate, cellosolve acetate, and propylene glycol methyl ether acetate.

Examples of the ketones include acetone, methyl ethyl ketone, methyl isobutyl ketone, and cyclohexanone. Examples of the cyclic ethers include tetrahydrofuran and dioxane. Examples of the amides include N,N-dimethylformamide and N,N-dimethylacetamide.

Examples of the aromatic hydrocarbons include xylene, toluene, and solvent naphtha.

Examples of the glycol ethers include propylene glycol methyl ether and ethyl cellosolve.

Examples of the diethylene glycol esters include carbitol acetate.

Examples of the aliphatic hydrocarbons include n-pentane, n-hexane, n-heptane, n-octane, n-nonane, n-decane, n-undecane, n-dodecane, and mineral spirit.

Examples of the alcohols include methyl alcohol, ethyl alcohol, and propyl alcohol.

The active energy ray curable composition has a content of the surface tension regulator of preferably not less than 0.001% by mass and more preferably not less than 0.01% by mass. The content of the surface tension regulator in the active energy ray curable composition is preferably not more than 5% by mass and more preferably not more than 3% by mass.

A polymerization inhibitor may also be contained in the active energy ray curable composition. Examples of the polymerization inhibitor include a hindered phenol compound, a hindered amine compound, a nitrosamine compound, a hydroquinone compound, a benzoquinone compound, a phosphorus compound, and a sulfur compound.

A filler may also be contained in the active energy ray curable composition. By the filler being contained, the surface of the cured product can be improved in sliding property and scratch resistance. Also, by the filler being contained, a cured product that is matte can be obtained. Examples of the filler include an extender pigment and resin beads. Examples of the extender pigment include calcium carbonate, spherical silica, and hollow silica.

A coloring component may also be contained in the active energy ray curable composition. Examples of the coloring component include a pigment and a dye. The pigment may be an organic pigment or an inorganic pigment. Examples of the inorganic pigment include carbon black, iron oxide, titanium oxide, and calcium carbonate. Examples of the organic pigment include an azo pigment, a lake pigment, a phthalocyanine pigment, a quinacridone pigment, a dioxazine pigment, a perylene red pigment, an isoindolinone pigment, a pyranthrone pigment, a thioindigo pigment, a benzimidazolone pigment, a quinophthalone pigment, and an isoindoline pigment. Examples of the dye include a direct dye, a reactive dye, an acid dye, a cationic dye, a naphthol dye, and a disperse dye.

If the filler or the coloring component is to be contained in the active energy ray curable composition, a dispersant may be used as necessary. Examples of the dispersant include a polymer type dispersant and a low molecular type dispersant.

The active energy ray curable composition can be used in an application of forming a cured product that is colorless and transparent or a cured product that is colored and transparent. If in this case, the active energy ray curable composition contains a pigment, the active energy rays may be physically shielded by the pigment during active energy ray irradiation. In regard to this point, the active energy ray curable composition preferably does not contain a pigment. In this case, physical shielding of the active energy rays by the pigment can be prevented and reactivity to the active energy rays can be increased.

<Base Material to Which the Active Energy Ray Curable Composition is Applied>

The base material to which the active energy ray curable composition is applied is not restricted in particular. Examples of the base material include a paper base material, a resin base material, a metal base material, a glass base material, a rubber base material, and a ceramic base material. Examples of the paper base material include coated paper, art paper, fine coating paper, woodfree paper, and synthetic paper. Examples of a resin of the resin base material include polyethylene resin, polyester resin, polypropylene resin, acrylic resin, polyamide resin, polycarbonate resin, polystyrene resin, and vinyl chloride resin. Examples of a form of the resin base material include film, sheet, plate, and other formed objects. Examples of a metal of the metal base material include stainless steel, aluminum, iron, and copper. Examples of a form of the metal base material include plate and other formed objects.

The base material to which the active energy ray curable composition is applied may be a record object recording information such as a character, a photograph, an illustration, a figure, or a symbol. A method of recording the information is not restricted in particular. Examples of the method of recording the information include inkjet printing, offset printing, toner printing, flexographic printing, sublimation printing, gravure printing, silk screen printing, pad printing, spray coating, and paintbrush or writing brush coating.

The base material may be a base material in which different materials are combined. Examples of the base material in which different materials are combined include a vapor deposited film with which a metal or a ceramic is deposited on a resin film.

<Method of Using the Active Energy Ray Curable Composition>

The active energy ray curable composition can be coated on a base material to form a coating layer and the coating layer can be cured by irradiation of active energy rays to form a cured product on the base material. Examples of a method for forming the coating layer on the base material include inkjet printing, offset printing, roll coater printing, flexographic printing, gravure printing, silk screen printing, pad printing, spray coating, and paintbrush coating.

The active energy ray curable composition can be used favorably in inkjet printing applications.

The thickness of the coating layer formed by coating the active energy ray curable composition on the base material is not restricted in particular. The thickness of the coating layer may, for example, be not more than 30 μm and may be not more than 25 μm. Also, the thickness of the coating layer as stated here is the thickness of a single layer and, for example, by repeating coating and curing of the active energy ray curable composition on the base material, a cured product, for example, of not less than 500 μm may be formed.

The coating layer formed by coating the active energy ray curable composition on the base material may be comparatively thin as described above. Such a comparatively thin coating layer can be formed easily by coating the active energy ray curable composition on the base material by inkjet printing.

The cured product may have a single layer structure or may have a multiple layer structure that is formed by overlaying a plurality of cured films.

If a coloring component is contained in the active energy ray curable composition, the active energy ray curable composition can be used as an ink or a paint. In this case, for example, a character, a photograph, an illustration, a figure, or a symbol can be formed by the cured product.

If a coloring component is not contained in the active energy ray curable composition, the active energy ray curable composition can be used as a decorating ink, an overprint varnish, an undercoating agent, or an adhesive. The decorating ink is used for an application of improving a design property or appeal of the base material. The overprint varnish is used to protect the base material or impart a design property such as glossiness or matte quality to the base material. Examples of the undercoating agent include a primer that improves an adhesion property or a wettability of the base material. The adhesive is used for an application of adhering applicable base materials to each other or transferring an applicable base material and a drawing pattern.

Operations and Effects of the Embodiment

Operations and effects of the embodiment will now be described.

(1) The active energy ray curable composition contains the (A) radical polymerizable compound, the (B) photopolymerization initiator, and the (C) amine compound. The (B) photopolymerization initiator includes the (B1) sulfur compound and the (B2) acyl phosphine oxide compound. The (B1) sulfur compound is at least one of the sulfone compound and the thiobenzoyl compound.

This makes it possible to improve curability of the active energy ray curable composition. To describe specifically, it is presumed that by having a sulfur atom that becomes a radical generating point, the sulfone compound of the (B1) sulfur compound generates a sulfonate radical of high reactivity. It is presumed that by having a sulfur atom in a conjugated system continuous to a ketone group that is in a thiobenzoyl group and becomes a radical generating point, the thiobenzoyl compound of the (B1) sulfur compound generates a thio radical of high reactivity. Also, the (B2) acyl phosphine oxide compound is presumed to promote curing of the active energy ray curable composition at an interface with the base material on which the active energy ray curable composition is coated.

The radical polymerization of the (A) radical polymerizable compound is easily inhibited due to oxygen dissolved in the active energy ray curable composition and oxygen in the atmosphere. In regard to this point, the (C) amine compound is presumed to reduce the inhibition of the radical polymerization due to oxygen. That is, the (C) amine compound is presumed to promote reactions by the (B1) sulfur compound and the (B2) acyl phosphine oxide compound to improve the curability of the active energy ray curable composition.

(2) The (C) amine compound preferably includes at least one of the (C1) amino modified compound and the (C2) aromatic amine compound mentioned above. In this case, it is possible to further improve the curability of the active energy ray curable composition.

(3) The content of the (B) photopolymerization initiator in the active energy ray curable composition is preferably not less than 4.2% by mass. The content of the (B1) sulfur compound in the active energy ray curable composition is preferably not less than 0.4% by mass. The content of the (B2) acyl phosphine oxide compound in the active energy ray curable composition is preferably not less than 0.7% by mass. In this case, it is possible to further improve the curability of the active energy ray curable composition.

(4) The (B) photopolymerization initiator preferably further includes the (B3) thioxanthone compound. In this case, it is possible, for example, to further improve the curability of the active energy ray curable composition. To describe in detail, as with the thiobenzoyl compound, the (B3) thioxanthone compound generates a thio group of high reactivity by having a sulfur atom in a conjugated system continuous to a ketone group that becomes a radical generating point.

Also, the (C) amine compound is presumed to promote a reaction by the (B3) thioxanthone compound to improve the curability of the active energy ray curable composition.

If the content of the (B3) thioxanthone compound in the active energy ray curable composition is not more than 1.0% by mass, it is possible to suppress yellowing of the cured product due to the (B3) thioxanthone compound.

(5) The number of functional groups of the (A) radical polymerizable compound is preferably 1 to 3. In this case, it is possible to make the active energy ray curable composition low in viscosity. Therefore, for example, when the active energy ray curable composition is used in an application of applying to a base material by inkjet printing, it can be improved in property of ejection from an inkjet head. An energy required to cure the active energy ray curable composition tends to increase when the number of functional groups of the (A) radical polymerizable compound is comparatively low. Even in such a case, it is possible to suppress a consumption amount of energy because it is possible to improve the curability with the active energy ray curable composition according to the embodiment as described above.

(6) When active energy rays are irradiated onto a coating layer formed by coating the active energy ray curable composition on a record object, the active energy rays are easily absorbed by a coloring material in the record object. That is, the active energy rays are unlikely to be reflected by the surface of the record object and therefore, an energy consumption amount of the active energy rays for forming the cured product from the coating layer tends to increase. The active energy ray curable composition according to the embodiment can improve the curability and is thus advantageous from a standpoint of suppressing the energy consumption in an application of forming a cured product on a record object.

(7) The active energy ray curable composition preferably does not contain a pigment. In this case, reactivity to irradiation of active energy rays can be improved and energy consumption can thus be suppressed.

(8) The active energy ray curable composition is preferably used in an inkjet printing application. In this case, a cured product that is made thinner can be efficiently obtained. When a comparatively thin coating layer is formed by inkjet printing the active energy ray curable composition, the polymerization of the (A) radical polymerizable compound becomes easily inhibited due to the oxygen in the active energy ray curable composition and the oxygen in the atmosphere. The active energy ray curable composition of the present embodiment contains the (C) amine compound as mentioned above and it is thus presumed that the inhibition of the polymerization of the (A) radical polymerizable compound due to the oxygen is reduced. It is thus especially advantageous in the point of improving the curability of the active energy ray curable composition in an inkjet printing application.

(9) By making the active energy ray curable composition contain the polymer, it becomes possible to improve such performance as the curability of the active energy ray curable composition, the glossiness of the cured product, a flexibility of the cured product, and adhesion property of the base material and the cured product.

EXAMPLES

Examples and comparative examples will now be described.

Examples 1 to 16

In Examples 1 to 16, respective raw materials were placed in containers to achieve the compositions shown in Tables 1 and 2 and after stirring in a hot water bath at 40° C. to 50° C. until there were no more solids, filtration using glass fiber filter paper (trade name: GS-25; manufactured by Advantec Toyo Kaisha, Ltd.) was performed to prepare active energy ray curable compositions.

The units of the numerical values indicating the compositions in Tables 1 and 2 are "% by mass". Also, the abbreviations in Tables 1 and 2 are as follows.

"Polymerizable compound A1" is the (A1) first polymerizable compound and is 2-(2-vinyloxyethoxy)ethyl acrylate (trade name: VEEA; manufactured by Nippon Shokubai Co., Ltd.).

"Polymerizable compound A2" is the (A2) second polymerizable compound and is phenoxypolyethylene glycol acrylate (trade name: SR9087; manufactured by Sartomer Corporation).

"Polymerizable compound A3" is 1,6-hexanediol diacrylate (trade name: NK Ester A-HD-N; manufactured by Shin-Nakamura Chemical Co., Ltd.).

"Polymerizable compound A4" is isooctyl acrylate (trade name: SR440; manufactured by Sartomer Corporation).

"Photopolymerization initiator B11" is the sulfone compound of the (B1) sulfur compound and is 1-[4-(4-benzoylphenylsulfanyl)phenyl]-2-methyl-2-(4-methylphenylsulfonyl)propane-1-one (trade name: ESACURE 1001M; manufactured by IGM Resins B. V.).

"Photopolymerization initiator B12" is the thiobenzoyl compound of the (B1) sulfur compound and is 4-benzoyl 4'-methyldiphenyl sulfide (trade name: OMNIRAD BMS; manufactured by IGM Resins B. V.).

"Photopolymerization initiator B13" is the thiobenzoyl compound of the (B1) sulfur compound and is 2-methyl-1-[4-(methylthio)phenyl]-2-morpholinopropane-1-one (trade name: GENOCURE PMP; manufactured by RAHN AG).

"Photopolymerization initiator B21" is the (B2) acyl phosphine oxide compound and is bis(2,4,6-trimethylbenzoyl)-phenylphosphine oxide (trade name: OMNIRAD 819; manufactured by IGM Resins B. V.).

"Photopolymerization initiator B22" is the (B2) acyl phosphine oxide compound and is 2,4,6-trimethylbenzoyl-diphenyl-phosphine oxide (trade name: OMNIRAD TPO; manufactured by IGM Resins B. V.).

"Photopolymerization initiator B3" is the (B3) thioxanthone compound and is 2-isopropylthioxanthone (trade name: Lunacure 2-ITX; manufactured by DKSH Japan K. K.).

"Photopolymerization initiator B4" is 1-hydroxycyclohexyl phenyl ketone (trade name: Lunacure 200; manufactured by DKSH Japan K. K.).

"Amine compound C1" is the amino modified acrylate oligomer (trade name: EBECRYL 80; manufactured by Daicel-Allnex Ltd.) of the (C1) amino modified compound of the (C) amine compound.

"Amine compound C2" is the (C2) aromatic amine compound (trade name: GENOPOL AB-2; manufactured by RAHN AG) of the (C) amine compound.

"Polymer" is a ketone resin (trade name: TEGO VARIPLUS SK; manufactured by EVONIK Industries AG).

"Surface tension regulator" is a polyether modified siloxane copolymer (trade name: TEGO GLIDE 440; manufactured by EVONIK Industries AG).

"Polymerization inhibitor" is pentaerythritol tetrakis(3-(3,5-di-tert-butyl-4-hydroxyphenyl)propionate) (trade name: Irganox 1010; manufactured by BASF SE).

Comparative Examples 1 to 7

With Comparative Examples 1 to 7, active energy ray curable compositions were prepared as in Examples 1 to 16 with the exception of changing the compositions as shown in Table 3. The units of the numerical values indicating the compositions in Table 3 are "% by mass".

"Photopolymerization initiator B5" in Table 3 is benzophenone (trade name: GENOCURE BP; manufactured by RAHN AG).

(Evaluation of Curability)

As printed matter for curability evaluation, coated papers (trade name: OK Super Post; manufactured by Oji materia Co., Ltd.) respectively having 100% solid images of respective colors of CMYK printed thereon using a production printer (trade name: Versant 180 Press; manufactured by Fuji Xerox Co., Ltd.) were prepared. Next, the active energy ray curable composition of Example 1 was coated using a bar coater on each printed matter for curability evaluation and by irradiating ultraviolet rays using a metal halide lamp, a film with an average thickness of 5 μm was obtained. Thereafter, the surface of the film was rubbed with paper wiper for 10 reciprocations at a pressure of 6 kgf/cm$^2$. If the surface of the film was not flawed even upon rubbing for 10 reciprocations, it was determined that a cured film was obtained. On the other hand, if upon rubbing for 10 reciprocations, the surface of the film became flawed, or the film became shaved off together with a printing layer of the printed matter for curability evaluation, or the surface of the film became sticky, the film was determined to be uncured.

The curability was evaluated as follows based on an irradiation condition of ultraviolet rays with which a cured film is obtained.

If cured with an irradiation condition of a cumulative light amount of ultraviolet rays of not more than 100 mJ/cm$^2$: curability is extremely excellent (◯◯).

If cured with an irradiation condition of a cumulative light amount of ultraviolet rays of not less than 101 mJ/cm$^2$ and not more than 120 mJ/cm$^2$: curability is excellent (◯).

If uncured with an irradiation condition of a cumulative light amount of ultraviolet rays of 120 mJ/cm$^2$: curability is poor (×).

As with the active energy ray curable composition of Example 1, evaluation of curability was also performed on the active energy ray curable compositions of Examples 2 to 16 and Comparative Examples 1 to 7. The evaluation results of curability are shown in Tables 1 to 3.

(Evaluation of Yellowing)

The active energy ray curable composition of Example 1 was coated using a bar coater on blank coated paper (trade name: OK Super Post; manufactured by Oji materia Co., Ltd.) and by irradiating ultraviolet rays using a metal halide lamp with an irradiation condition of a cumulative light amount of 120 mJ/cm$^2$, a cured film with an average thickness of 15 μm was obtained.

The obtained cured film was left for 1 day under room temperature and thereafter, a yellowness index (YI: ASTM E313) of the cured film and a yellowness index of the coated paper were measured using a spectrophotometer (CM-5; manufactured by Konica Minolta, Inc.). A yellowing degree (ΔYI) was calculated from a difference between the yellowness index of the cured film and the yellowness index of the coated paper.

Yellowing was evaluated as follows from the calculated yellowing degree.

If the yellowing degree (ΔYI) is not more than 10.0: excellent (◯◯).

If the yellowing degree (ΔYI) is not less than 10.1 and not more than 15.0: satisfactory (◯).

If the yellowing degree (ΔYI) is not less than 15.1: poor (×).

As with the active energy ray curable composition of Example 1, evaluation of yellowing was also performed on the active energy ray curable compositions of Examples 2 to 16 and Comparative Examples 1 to 7. The evaluation results of yellowing are shown in Tables 1 to 3. If any of Comparative Examples 1 to 7 was uncured and stickiness of the surface of the film remained with an irradiation condition of 120 mJ/cm$^2$, it was determined to be unevaluable (−).

TABLE 1

|     |      |                              | Examples |      |      |      |      |      |      |      |
|-----|------|------------------------------|------|------|------|------|------|------|------|------|
|     |      |                              | 1    | 2    | 3    | 4    | 5    | 6    | 7    | 8    |
| (A) |      | Polymerizable compound A1    | 36.0 | 37.0 | 37.0 | 37.0 | 37.0 | 37.0 | 37.0 | 37.0 |
|     |      | Polymerizable compound A2    | 25.0 | 25.0 | 25.0 | 25.0 | 25.0 | 25.0 | 25.0 | 25.0 |
|     |      | Polymerizable compound A3    | 20.0 | 20.0 | 20.0 | 20.0 | 20.0 | 20.0 | 20.0 | 20.0 |
|     |      | Polymerizable compound A4    | 5.0  | 5.0  | 5.0  | 5.0  | 5.0  | 5.0  | 5.0  | 5.0  |
| (B) | (B1) | Photopolymerization initiator B11 | 4.0 | 3.0 | — | — | 3.0 | — | — | 3.0 |
|     |      | Photopolymerization initiator B12 | — | — | 3.0 | — | — | 3.0 | — | — |
|     |      | Photopolymerization initiator B13 | — | — | — | 3.0 | — | — | 3.0 | — |
|     | (B2) | Photopolymerization initiator B21 | 2.0 | 2.0 | 2.0 | 2.0 | — | — | — | — |
|     |      | Photopolymerization initiator B22 | — | — | — | — | 2.0 | 2.0 | 2.0 | 2.0 |
| (C) | (C1) | Amine compound C1            | 5.0  | 5.0  | 5.0  | 5.0  | 5.0  | 5.0  | 5.0  | —    |
|     | (C2) | Amine compound C2            | —    | —    | —    | —    | —    | —    | —    | 5.0  |
| Polymer |  |                              | 2.0  | 2.0  | 2.0  | 2.0  | 2.0  | 2.0  | 2.0  | 2.0  |
| Surface tension regulator | | | 0.5 | 0.5 | 0.5 | 0.5 | 0.5 | 0.5 | 0.5 | 0.5 |
| Polymerization inhibitor | | | 0.5 | 0.5 | 0.5 | 0.5 | 0.5 | 0.5 | 0.5 | 0.5 |
| Total |    |                              | 100.0| 100.0| 100.0| 100.0| 100.0| 100.0| 100.0| 100.0|
| Evaluation results | | Curability          | ◯◯   | ◯    | ◯    | ◯    | ◯    | ◯    | ◯    | ◯    |
|     |      | Yellowness                   | ◯◯   | ◯◯   | ◯◯   | ◯◯   | ◯◯   | ◯◯   | ◯◯   | ◯    |

TABLE 2

|     |      |                              | Examples |      |      |      |      |      |      |      |
|-----|------|------------------------------|------|------|------|------|------|------|------|------|
|     |      |                              | 9    | 10   | 11   | 12   | 13   | 14   | 15   | 16   |
| (A) |      | Polymerizable compound A1    | 37.5 | 36.0 | 36.0 | 36.0 | 37.8 | 37.5 | 37.0 | 36.8 |
|     |      | Polymerizable compound A2    | 25.0 | 25.0 | 25.0 | 25.0 | 25.0 | 25.0 | 25.0 | 25.0 |
|     |      | Polymerizable compound A3    | 20.0 | 20.0 | 20.0 | 20.0 | 20.0 | 20.0 | 20.0 | 20.0 |
|     |      | Polymerizable compound A4    | 5.0  | 5.0  | 5.0  | 5.0  | 5.0  | 5.0  | 5.0  | 5.0  |
| (B) | (B1) | Photopolymerization initiator B11 | 2.5 | 0.7 | 0.4 | 1.0 | 2.0 | 2.0 | 2.0 | 2.0 |
|     | (B2) | Photopolymerization initiator B21 | 2.0 | 2.0 | 2.0 | 0.7 | 2.0 | 2.0 | 2.0 | 2.0 |
|     | (B3) | Photopolymerization initiator B3 | — | — | — | — | 0.2 | 0.5 | 1.0 | 1.2 |
|     | (B4) | Photopolymerization initiator B4 | 3.3 | 3.6 | 4.3 | — | — | — | — | — |
| (C) | (C1) | Amine compound C1            | 5.0  | 5.0  | 5.0  | 5.0  | 5.0  | 5.0  | 5.0  | 5.0  |
|     | (C2) | Amine compound C2            | —    | —    | —    | —    | —    | —    | —    | —    |
| Polymer |  |                              | 2.0  | 2.0  | 2.0  | 2.0  | 2.0  | 2.0  | 2.0  | 2.0  |
| Surface tension regulator | | | 0.5 | 0.5 | 0.5 | 0.5 | 0.5 | 0.5 | 0.5 | 0.5 |
| Polymerization inhibitor | | | 0.5 | 0.5 | 0.5 | 0.5 | 0.5 | 0.5 | 0.5 | 0.5 |
| Total |    |                              | 100.0| 100.0| 100.0| 100.0| 100.0| 100.0| 100.0| 100.0|
| Evaluation results | | Curability          | ◯    | ◯◯   | ◯◯   | ◯    | ◯    | ◯◯   | ◯◯   | ◯◯   |
|     |      | Yellowness                   | ◯◯   | ◯◯   | ◯◯   | ◯    | ◯◯   | ◯    | ◯    | x    |

TABLE 3

|     |      |                              | Examples |      |      |      |      |      |      |
|-----|------|------------------------------|------|------|------|------|------|------|------|
|     |      |                              | 1    | 2    | 3    | 4    | 5    | 6    | 7    |
| (A) |      | Polymerizable compound A1    | 37.0 | 37.0 | 37.0 | 37.0 | 37.0 | 36.0 | 42.0 |
|     |      | Polymerizable compound A2    | 25.0 | 25.0 | 25.0 | 25.0 | 25.0 | 25.0 | 25.0 |
|     |      | Polymerizable compound A3    | 20.0 | 20.0 | 20.0 | 20.0 | 20.0 | 20.0 | 20.0 |
|     |      | Polymerizable compound A4    | 5.0  | 5.0  | 5.0  | 5.0  | 5.0  | 5.0  | 5.0  |
| (B) | (B1) | Photopolymerization initiator B11 | 5.0 | — | — | — | — | — | 3.0 |
|     |      | Photopolymerization initiator B12 | — | 5.0 | — | — | — | — | — |
|     |      | Photopolymerization initiator B13 | — | — | 5.0 | — | — | — | — |
|     | (B2) | Photopolymerization initiator B21 | — | — | — | 5.0 | 2.0 | — | 2.0 |
|     | (B4) | Photopolymerization initiator B4 | — | — | — | — | — | 6.0 | — |
|     | (B5) | Photopolymerization initiator B5 | — | — | — | — | — | — | — |
| (C) | (C1) | Amine compound C1            | 5.0  | 5.0  | 5.0  | 5.0  | 5.0  | 5.0  | —    |
|     | (C2) | Amine compound C2            | —    | —    | —    | —    | —    | —    | —    |

TABLE 3-continued

|  |  | Examples | | | | | | |
| --- | --- | --- | --- | --- | --- | --- | --- | --- |
|  |  | 1 | 2 | 3 | 4 | 5 | 6 | 7 |
| Polymer | | 2.0 | 2.0 | 2.0 | 2.0 | 2.0 | 2.0 | 2.0 |
| Surface tension regulator | | 0.5 | 0.5 | 0.5 | 0.5 | 0.5 | 0.5 | 0.5 |
| Polymerization inhibitor | | 0.5 | 0.5 | 0.5 | 0.5 | 0.5 | 0.5 | 0.5 |
| Total | | 100.0 | 100.0 | 100.0 | 100.0 | 100.0 | 100.0 | 100.0 |
| Evaluation results | Curability | x | x | x | x | x | x | x |
| | Yellowness | ○○ | ○○ | ○○ | — | ○○ | ○ | — |

It can be understood that the active energy ray curable compositions of Examples 1 to 16 are more excellent in curability than the active energy ray curable compositions of Comparative Examples 1 to 7.

It can be understood that the active energy ray curable compositions of Examples 13 to 15 can suppress the yellowing degree to be lower than the active energy ray curable composition of Example 16. Based on this result, if the content of the (B3) thioxanthone compound is not more than 1.0% by mass, it is possible to suppress the yellowing of the cured film due to the (B3) thioxanthone compound.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An active energy ray curable composition cured by irradiation of active energy rays, comprising an (A) radical polymerizable compound, a (B) photopolymerization initiator, and a (C) amine compound, wherein
    the (B) photopolymerization initiator includes a (B1) sulfur compound and a (B2) acyl phosphine oxide compound, and
    the (B1) sulfur compound is a combination of a sulfone compound and a thiobenzoyl compound or is a sulfone compound.

2. The active energy ray curable composition according to claim 1, wherein
    the (C) amine compound includes at least one of a (C1) amino modified compound and a (C2) aromatic amine compound, and
    the (C1) amino modified compound is at least one of an amino modified acrylate oligomer and an amino modified acrylate polymer.

3. The active energy ray curable composition according to claim 1, wherein
    the active energy ray curable composition has a content of the (B) photopolymerization initiator of not less than 4.2% by mass,
    the active energy ray curable composition has a content of the (B1) sulfur compound of not less than 0.4% by mass, and
    the active energy ray curable composition has a content of the (B2) acyl phosphine oxide compound of not less than 0.7% by mass.

4. An active energy ray curable composition cured by irradiation of active energy rays, comprising an (A) radical polymerizable compound, a (B) photopolymerization initiator, and an (C) amine compound, wherein
    the (B) photopolymerization initiator includes a (B1) sulfur compound, a (B2) acyl phosphine oxide compound, and a (B3) thioxanthone compound,
    the (B1) sulfur compound is at least one of a sulfone compound and a thiobenzoyl compound, and
    the active energy ray curable composition has a content of the (B3) thioxanthone compound of not more than 1.0% by mass.

5. An active energy ray curable composition cured by irradiation of active energy rays, comprising an (A) radical polymerizable compound, a (B) photopolymerization initiator, and a (C) amine compound, wherein
    the (A) radical polymerizable compound includes at least one of an (A1) first polymerizable compound and an (A2) second polymerizable compound,
    the (A1) first polymerizable compound has a (meth) acryloyl group and at least one of a vinyl ether group and an allyl ether group,
    the (A2) second polymerizable compound is a (meth) acrylate compound having an aromatic skeleton,
    the (B) photopolymerization initiator includes a (B1) sulfur compound and a (B2) acyl phosphine oxide compound, and
    the (B1) sulfur compound is at least one of a sulfone compound and a thiobenzoyl compound.

6. The active energy ray curable composition according to claim 1, wherein the number of functional groups of the (A) radical polymerizable compound is 1 to 3.

7. The active energy ray curable composition according to claim 1, wherein the active energy ray curable composition is used in an application of forming a cured product on a record object.

8. The active energy ray curable composition according to claim 1, wherein the active energy ray curable composition does not contain a pigment.

9. The active energy ray curable composition according to claim 1, wherein the active energy ray curable composition is used in an inkjet printing application.

* * * * *